United States Patent
Sreenivas Prasad

(10) Patent No.: US 9,928,301 B2
(45) Date of Patent: *Mar. 27, 2018

(54) CLASSIFYING UNIFORM RESOURCE LOCATORS

(71) Applicant: International Business Machines Corporation, Armonk, NY (US)

(72) Inventor: Arun Kumar Sreenivas Prasad, Trivandrum (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/391,902

(22) Filed: Dec. 28, 2016

(65) Prior Publication Data

US 2017/0103138 A1    Apr. 13, 2017

Related U.S. Application Data

(63) Continuation of application No. 15/067,454, filed on Mar. 11, 2016, now Pat. No. 9,582,565, which is a continuation of application No. 14/295,425, filed on Jun. 4, 2014, now Pat. No. 9,569,522.

(51) Int. Cl.
*G06F 17/30* (2006.01)
*G06Q 10/10* (2012.01)
*G06F 12/02* (2006.01)
*G06F 7/06* (2006.01)
(Continued)

(52) U.S. Cl.
CPC .. *G06F 17/30867* (2013.01); *G06F 17/30598* (2013.01); *G06F 17/30887* (2013.01); *H04L 67/02* (2013.01)

(58) Field of Classification Search
CPC ......... G06F 17/30607; G06F 17/30595; G06F 12/02; G06F 12/0246; G06F 7/06; G06F 15/18; G06F 21/00; G06Q 10/10
USPC ................ 707/740, 738, E17.014; 711/103; 726/22
See application file for complete search history.

(56) References Cited

U.S. PATENT DOCUMENTS

| 7,590,707 | B2 | 9/2009 | McCloy, III et al. |
| 8,078,625 | B1 | 12/2011 | Zhang et al. |
| 8,176,079 | B1 | 5/2012 | Spertus |

(Continued)

FOREIGN PATENT DOCUMENTS

| CN | 102253991 A | * 11/2011 |
| CN | 101605129 B | 2/2012 |

(Continued)

OTHER PUBLICATIONS

Baykan et al., "Purely URL-based Topic Classification", Poster Sessions: Wednesday, Apr. 22, 2009, WWW 2009, Apr. 20-24, 2009, Madrid, Spain, pp. 1109-1110.

(Continued)

*Primary Examiner* — Hosain Alam
*Assistant Examiner* — Robert F May
(74) *Attorney, Agent, or Firm* — Stephen R. Yoder

(57) ABSTRACT

A target domain name is classified using hash strides including domain name components. The hash strides are fed into a set of bloom filters programmed to identify pre-determined domain name categories. A programmable mapping table is provided for selecting one of many probable classifications.

1 Claim, 5 Drawing Sheets

(51) Int. Cl.
*G06F 15/18* (2006.01)
*H04L 29/08* (2006.01)

(56) References Cited

U.S. PATENT DOCUMENTS

| | | | | |
|---|---|---|---|---|
| 8,533,206 | B1* | 9/2013 | Guha | G06F 17/30887 707/705 |
| 8,615,800 | B2* | 12/2013 | Baddour | G06F 17/30864 705/14.6 |
| 9,152,661 | B1* | 10/2015 | Sathe | G06F 17/3033 |
| 9,378,282 | B2* | 6/2016 | Hubbard | G06F 17/30864 |
| 9,680,866 | B2* | 6/2017 | Baddour | H04L 63/145 |
| 2009/0089278 | A1* | 4/2009 | Poola | G06F 17/30864 |
| 2011/0191342 | A1* | 8/2011 | Cohen | G06Q 30/02 707/737 |
| 2012/0158626 | A1* | 6/2012 | Zhu | G06F 21/56 706/13 |
| 2012/0239667 | A1* | 9/2012 | Vysyaraju | G06F 17/3089 707/749 |
| 2013/0066814 | A1 | 3/2013 | Bosch et al. | |
| 2014/0136762 | A1* | 5/2014 | Li | G06F 12/0246 711/103 |
| 2014/0280155 | A1* | 9/2014 | Elliot | G06F 17/3071 707/737 |
| 2015/0356196 | A1 | 12/2015 | Sreenivas Prasad | |
| 2016/0124873 | A1* | 5/2016 | Xu | G06F 13/4243 711/105 |
| 2016/0179929 | A1 | 6/2016 | Sreenivas Prasad | |

FOREIGN PATENT DOCUMENTS

| | | | |
|---|---|---|---|
| CN | 102663022 | A | 9/2012 |
| CN | 103778217 | A * | 5/2014 |
| CN | 102253991 | B | 7/2014 |
| EP | 2466500 | A1 | 6/2012 |
| WO | 2008069945 | A2 | 6/2008 |
| WO | 2009023583 | A2 | 2/2009 |
| WO | 2011094746 | A2 | 8/2011 |

OTHER PUBLICATIONS

Bloom, Burton H., "Space/Time Trade-offs in Hash Coding with Allowable Errors", Communications of the ACM, vol. 13 No. 7, Jul. 1970, pp. 422-426, New York, NY, USA.

Feng et al., "An Efficient Caching Mechanism for Network-based URL Filtering by Multi-level Counting Bloom Filters", This full text paper was peer reviewed at the direction of IEEE Communications Society subject matter experts for publication in the IEEE ICC 2011 proceedings, © 2011 IEEE.

Kan et al., "Fast webpage classification using URL features", Proceedings of the 14th ACM international conference on Information and knowledge management, CIKM'05, New York, NY, USA, © 2005.

Kolcz et al., "Topical Host Reputation for Lightweight Url Classification", Microsoft Research, Jul. 6, 2012, <http://research.microsoft.com/apps/pubs/default.aspx?id=168636>.

Shih et al., "Using URLs and Table Layout for Web Classification Tasks", WWW2004, May 17-22, 2004, New York, New York, USA, pp. 193-202.

Slawski, Bill, "How Google May Classify Pages Using Hierarchical Categories in URLs", Jul. 12, 2013, <http://www.seobythesea.com/2013/07/google-classify-pages-hierarchical-categories-urls/>.

Zhou et al., "A High-Performance URL Lookup Engine for URL Filtering Systems", This full text paper was peer reviewed at the direction of IEEE Communications Society subject matter experts for publication in the IEEE ICC 2010 proceedings, © 2010 IEEE.

"Behavioral targeting", Wikipedia, the free encyclopedia, page last modified on Dec. 10, 2013, <https://en.wikipedia.org/wiki/Behavioral_targeting>.

"Master Database URL Categories", Provided by inventor in Main Idea for Disclosure dated Jun. 28, 2013, <http://www.websense.com/content/websense-url-categories.aspx>.

"ODP—Open Directory Project", dmoz, In partnership with Aol Search, Build 2.1.4-732418 Mon Mar. 10 10:26:49 EDT 2014, © 1998-2014 AOL Inc., <http://www.dmoz.org/>.

"URL Categorization", paloalto Networks, Tech Note, PAN-OS 4.1, Revision C, © 2012, Palo Alto Networks, Inc., pp. 1-8, <www.paloaltonetworks.com>.

"zveloDB® URL Database", Provided by inventor in Main Idea for Disclosure dated Jun. 28, 2013, <https://zvelo.com/services/zvelodb-url-database>.

Sophos, "Advanced Web Protection Made Simple", Found on Disclosure IN820130657, created by Arun Kumar56 on Jun. 28, 2013 05:35:00 AM CDT, accessed on Oct. 24, 2016 2:38 PM, © 1997-2016 Sophos Ltd., 9 pages, <https://www.sophos.com/en-us/products/secure-web-gateway.aspx>.

Sreenivas Prasad,A. , "Clearing Specified Blocks of Main Storage", U.S Appl. No. 15/389,594, filed Dec. 23, 2016, pp. 1-16.

IBM Appendix P.: "List of IBM Patents or Patent Applications Treated as Related", Dated Dec. 28, 2016, 2 pages.

* cited by examiner

CLASSIFYING UNIFORM RESOURCE LOCATORS

FIELD OF THE INVENTION

The present invention relates generally to the field of search engines, and more particularly to classifying uniform resource locators.

BACKGROUND OF THE INVENTION

It is often desirable to classify a uniform resource locator (URL) of a web page into topical categories without accessing underlying content. It is known to use URL classification techniques to classify a target web page. Known techniques rely on a variety of data sources including: (i) text of the web page itself; (ii) hyperlink structure of the web page; (iii) link structure of pages pointing to the target page; (iv) anchor text from pages pointing to the target page; and (v) location of the page according to the URL.

It is known to carry out URL classification operations on network packet streams. These operations are generally performed in an inline manner, that is, during the transfer of packets within the network packet stream. Web domain information is extracted from the network packet. The extracted information is looked up in a database to determine a corresponding URL category. The URL categories may be arbitrary and may be determined by the user. Example categories are: (i) art; (ii) business; (iii) computers; (iv) games; (v) health; (vi) home; (vii) news; (viii) reference; (ix) sports; (x) shopping; (xi) social networks; and/or (xii) finance. URL categories may also be based on open lists and/or commercially available lists.

SUMMARY

In one aspect of the present invention, a method, a computer program product, and a system for classifying a uniform resource locator (URL) includes: configuring a bloom filter to identify a pre-determined set of URL categories, programming the bloom filter with a set of URLs, each URL in the set of URLs belonging to a respectively corresponding URL category of the pre-determined URL categories, extracting a second URL in-line with a data transmission from a network packet stream, determining a set of hash strides for the second URL, querying the bloom filter with each hash stride of the set of hash strides, the querying being performed in a data plane, identifying a sub-set of categories from the pre-determined set of URL categories, the sub-set of categories being URL categories that correspond to the second URL, determining a first URL category based, at least in part, on a programmable mapping table that defines the sub-set of URL categories as the first URL category, and reporting the first URL category as a classification of the second URL in human-readable form.

DETAILED DESCRIPTION

Figure 1:
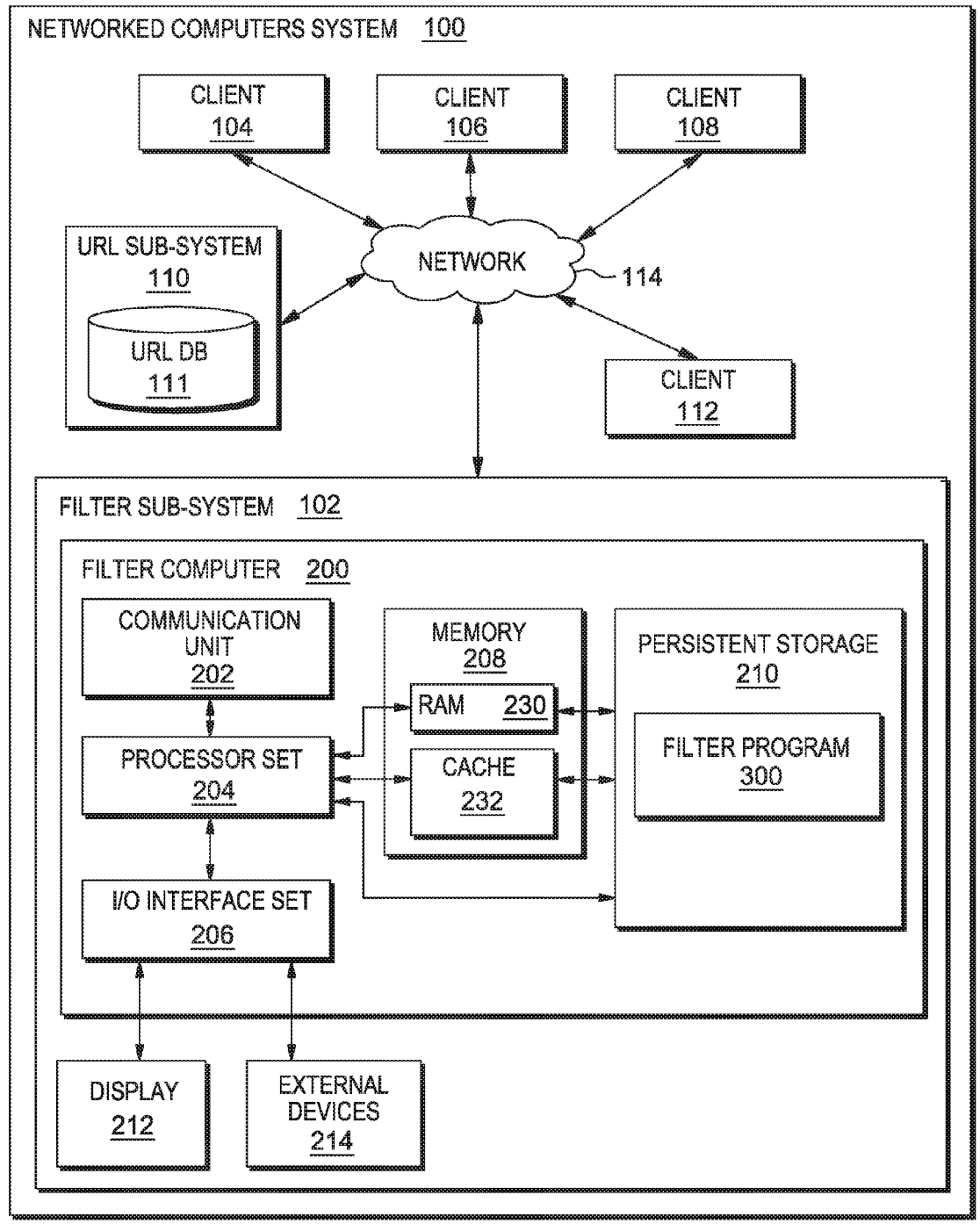
FIG. 1 is a schematic view of a first embodiment of a system according to the present invention.

A target domain name is classified using hash strides including domain name components. The hash strides are fed into a set of bloom filters programmed to identify pre-determined domain name classes. A programmable mapping table is provided for selecting one of many probable classifications. The present invention may be a system, a method, and/or a computer program product. The computer program product may include a computer readable storage medium (or media), having computer readable program instructions thereon for causing a processor to carry out aspects of the present invention. Alternatively, the present invention may be implemented in an application-specific integrated circuit (ASIC) or a field-programmable gate array (FPGA).

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer, or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or carry out combinations of special purpose hardware and computer instructions.

The present invention will now be described in detail with reference to the Figures. FIG. 1 is a functional block diagram illustrating various portions of networked computers system 100, in accordance with one embodiment of the present invention, including: filter sub-system 102; client sub-systems 104, 106, 108, 112; uniform resource locator (URL) sub-system 110; URL database 111; communication network 114; filter computer 200; communication unit 202; processor set 204; input/output (I/O) interface set 206; memory device 208; persistent storage device 210; display device 212; external device set 214; random access memory (RAM) devices 230; cache memory device 232; and filter program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Some embodiments of the present invention recognize the following facts, potential problems and/or potential areas for improvement with respect to the current state of the art: (i) a web page's URL is the least expensive to obtain; (ii) a web page's URL is one of the more informative sources with respect to classification; (iii) it is possible to identify URLs through lexical analysis of their URL structures alone; (iv) it is possible to categorize URLs through lexical analysis of their URL structures alone; (v) analyzing domain names inline is a high-performance scanning process and can introduce latency and delay for users accessing the web; (vi) a challenge for inline lookup of domain names is the lookup overhead for cases where the databases have millions of domain names grouped into hundreds of URL categories (some commercial URL databases have around 500 million domains that are grouped into around 140 categories); (vii) massive URL databases make the process of inline URL lookups hard to accomplish in real-time; and/or (viii) using massive URL databases for inline URL lookups requires a lot of memory to store the data.

Use cases, illustrating the function of various embodiments of the present invention, follow. For example, Able wants to feed customer-specific advertisements to Baker while the Baker is running Able's application. Some embodiments of the present invention provide Able with a list of URL categories associated with Baker by classifying various URLs in Baker's data packet stream while Baker is accessing the internet and/or using Able's application. These URL categories may be analyzed to infer and/or recommend relevant advertisements.

Another example use is where Charlie wants to charge Denise for use of Charlie's internet service according to websites visited by Denise. Specifically, Charlie wants to provide access to business websites at a premium, but is willing to provide access to social networking websites for free. Some embodiments of the present invention determine the category, or class, of websites visited by Denise to support Charlie's pricing policy.

Yet another example use involves blocking a particular category of website(s) from viewing. Evelyn wants to provide Frank with access to the internet, but does not want Frank to access any websites that are classified as being game sites. Some embodiments of the present invention provide for determining URL categories in the data plane in an inline fashion when Frank is attempting to gain access to the particular URL. In that way, Frank is prevented from accessing URLs of a specified category during a web-browsing session.

Figure 2:
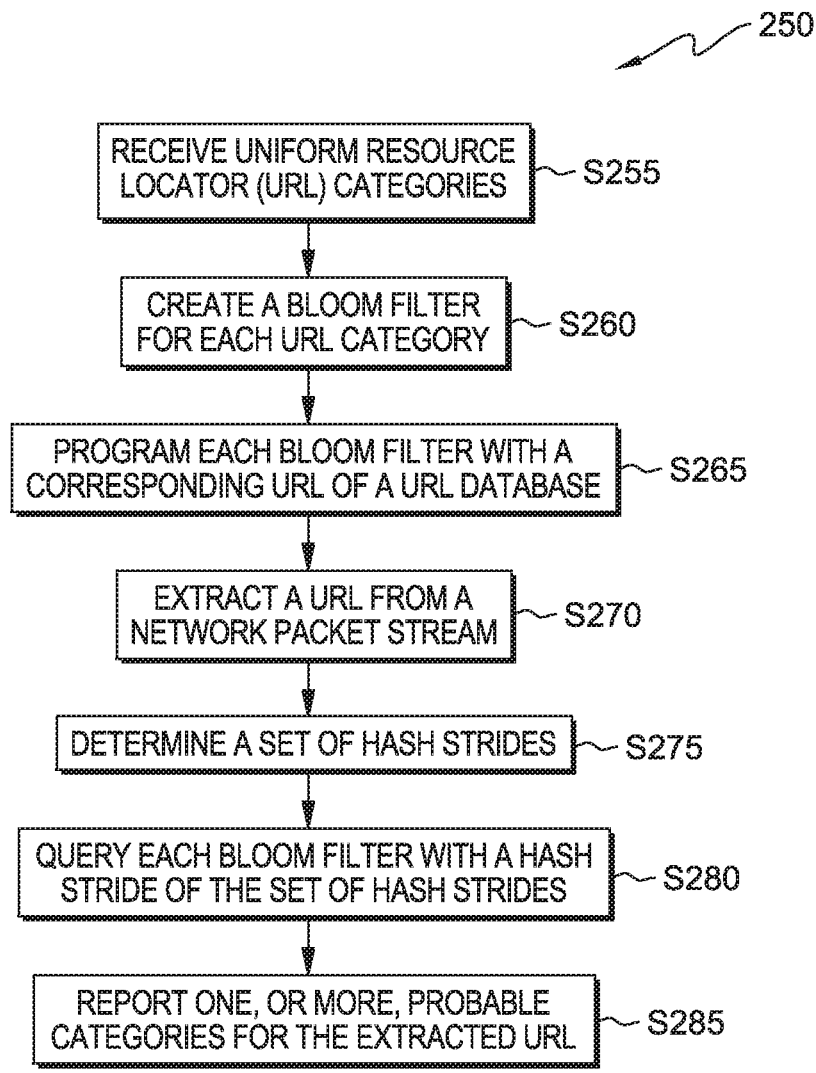
FIG. 2 is a flowchart showing a method performed, at least in part, by the first embodiment system.
Figure 3:
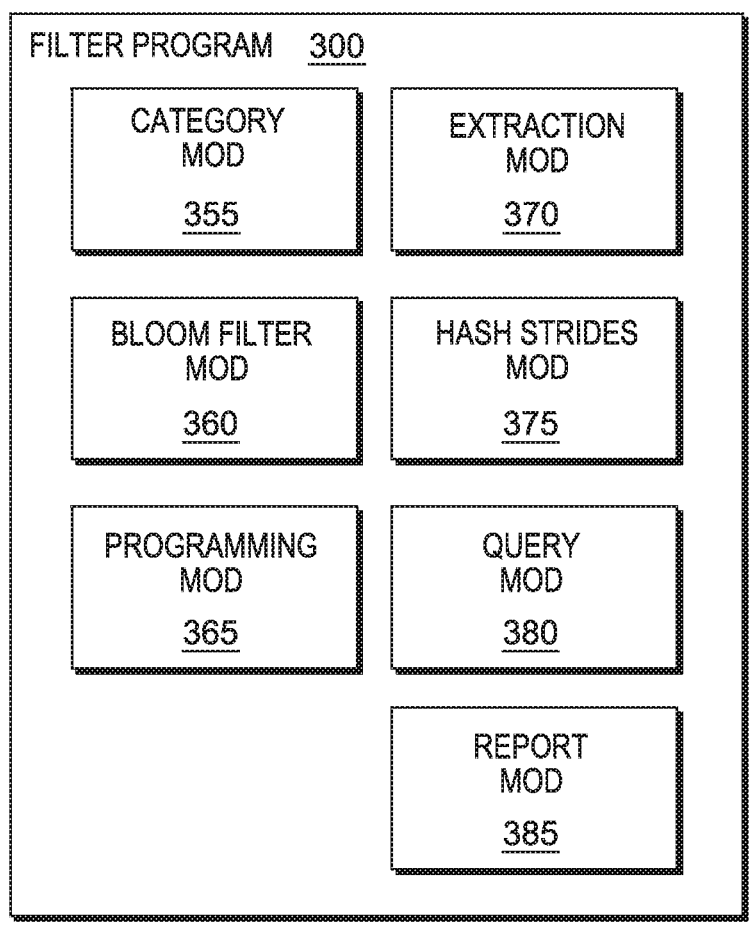
FIG. 3 is a schematic view of a machine logic (for example, software) portion of the first embodiment system.

FIG. 2 shows flowchart 250 depicting a first method according to the present invention. FIG. 3 shows filter program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where category module 355 obtains uniform resource locator (URL) categories. In this embodiment, the URL categories are available in URL database 111 of URL sub-system 110. The URL database is a private compiled database including user-specified categories. Alternatively, the URL categories are obtained from the public list DMOZ (directory.mozilla.org). (Note: the term(s) "DMOZ" and/or "mozilla" may be subject to trademark rights in various jurisdictions throughout the world and are used here only in reference to the products or services properly denominated by the marks to the extent that such trademark rights may exist.) Alternatively, another public URL database provides the URL categories. Alternatively, a commercially available URL database, such as the Websense master database, is the source for URL categories. (Note: the term "websense" may be subject to trademark rights in various jurisdictions throughout the world and are used here only in reference to the products or services properly denominated by the marks to the extent that such trademark rights may exist.)

Processing proceeds to step S260, where bloom filter module 360 creates a bloom filter for each URL category. A bloom filter is a space-efficient, probabilistic data structure that is used to test whether an element is a member of a set. As will be discussed further below, false positive matches are possible when using a bloom filter, but false negatives are not; that is, a query returns either "possibly in set" or "definitely not in set." In this embodiment, each bloom filter is created with respect to a URL category, or set of categories, obtained from a list of URL categories provided in step S255. Alternatively, the bloom filter(s) are created by a user on the fly as URL categories are recorded.

Processing proceeds to step S265, where programming module 365 programs each bloom filter with a corresponding URL of a URL database. In this embodiment, a set of URLs is specifically compiled and stored in URL database 111 as examples of the various user-specific categories recorded in the URL database. Alternatively, the public or private URL category list accessed in step S255 is further accessed to obtain a set of corresponding URLs. It should be noted that many available URL category databases include example URLs on which each category is based. In some cases, there are millions of URLs (or domain names) that correspond to hundreds of categories.

Processing proceeds to step S270, where extraction module 370 extracts a URL from a network packet stream. In this example, the data packet stream of a given user is searched for URL components at the control plane level and in an inline fashion. The URL components are assembled to create a number of "hash strides." The concept of hash strides will be discussed in more detail below. For now, a hash stride is any series of URL components and may be simply the hostname (or top domain) of the URL. Alternatively, only the top domains of the URLs are identified in the data packet stream. Alternatively, the data packet stream is sniffed periodically to detect a URL and a corresponding top domain and/or set of URL components.

Processing proceeds to step S275, where hash strides module 375 determines a set of hash strides from the extracted URL. A brief discussion regarding hash strides follows. The syntax of a hypertext transfer protocol (HTTP) URL consists of the scheme including a set of URL components: (i) host name; (ii) top domain name; (iii) path name; and/or (iv) query string. Generally, the URL components are delimited by a backslash, or reverse slash. Using the example URL, "http://www.hostname.com/primary_path/secondary_path/index.jsp," the hostname alone may indicate one URL category. Further, "hostname" and "primary_path" may indicate yet another URL category. Each set of URL components is referred to herein as a hash stride and may be used to indicate a particular URL category, as discussed below.

Processing proceeds to step S280, where query module 380 queries each bloom filter with a hash stride of the set of hash strides. In this embodiment, the query module applies a set of hash strides, determined from the extracted URL, as an input to the set of programmed bloom filters. The hash strides are selected based on the path components delimited by a backslash. Alternatively, the hash strides are selected based on alpha-numeric characters included in the extracted URL.

Processing ends at step S285, where report module 385 reports one, or more, probable categories for the extracted URL. In this embodiment, a most popular category is reported. That is, the most frequently occurring category among the indicated categories of the hash strides is reported. Alternatively, each identified category is reported according to the various hash strides that are applied to the filters. Alternatively, where the determined hash strides indicate multiple categories according to the bloom filter output, a programmable mapping table provides the single category to be reported. For example, the programmable mapping table may direct the filter program to report the "business" category whenever both categories "business" and "finance" are identified by the bloom filters.

Figure 4:
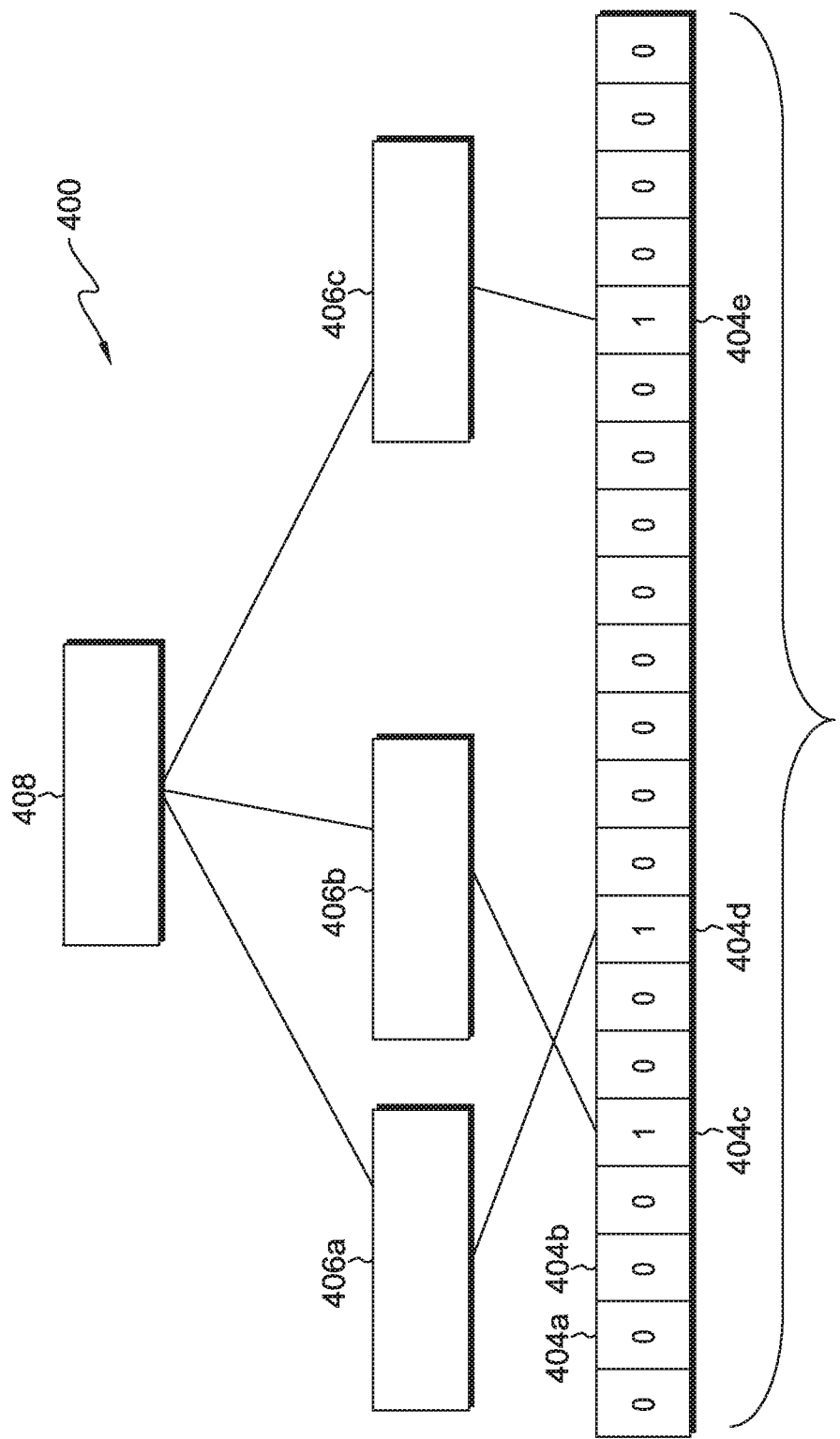
FIG. 4 is a diagram showing a first method performed according to an embodiment of the present invention.

Some embodiments of the present invention employ a technique that is illustrated in FIG. 4, which is a diagram of process 400 for programming bloom filter 402 of a URL category with a domain name 408. Initially, an empty bloom filter is created for each URL category. Generally, an empty bloom filter is a bit array of an "m" number of bits with each bit initially set to "0." There are "k" number of different hash functions defined, each of which maps, or hashes, some set element to one of the "m" array positions. As illustrated, hash functions 406a, 406b, and 406c are defined for domain name 408. Each of the hash functions are mapped to a set element of the bloom filter, such as set elements 404a, 404b, 404c, 404d, and 404e. The hash functions are assumed to provide a uniform random distribution. An element is added to the bloom filter by giving the element to each of the "k" hash functions, resulting in "k" array positions. The locations pointed to by the "k" hashes in the bit map are set to "1." In this way, each web domain is programmed into a bloom filter corresponding to a URL category. For example, after programming bloom filter 402 with URL 408, the bloom filter includes three elements, 404c, 404d, and 404e, where the corresponding bit map is set to "1."

Figure 5:
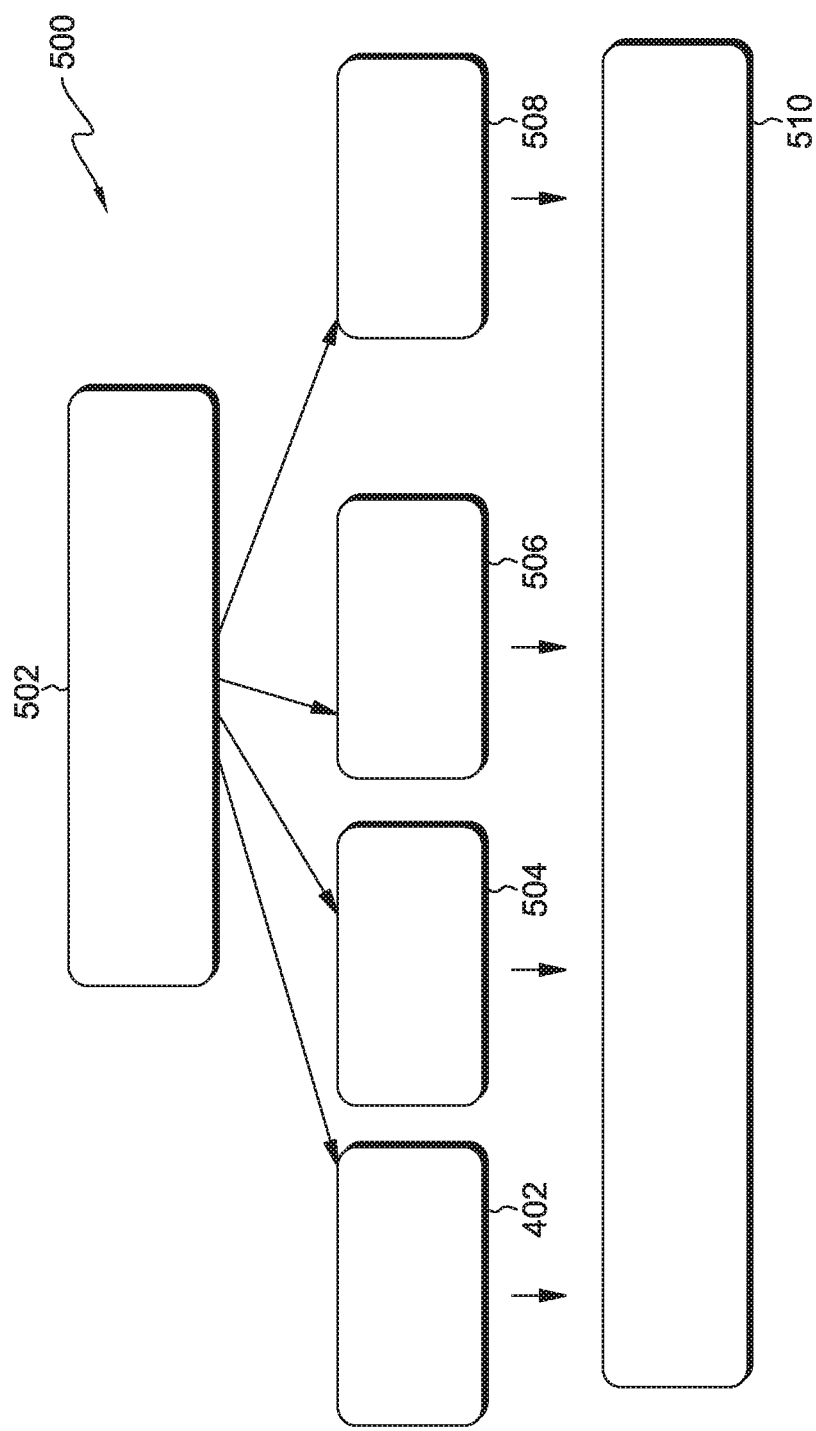
FIG. 5 is a diagram showing a second method performed according to an embodiment of the present invention.

FIG. 5 is a diagram illustrating process 500 using bloom filters 402, 504, 506, 508 to determine a category of domain name 502. When the bloom filters for each category are appropriately programmed, the set of bloom filters function to determine one, or more, categories of a web domain extracted from the network packet stream (such as domain name 502). This is accomplished by giving the extracted web domain to each of the bloom filters in the set as a query.

Some embodiments of the present invention query each bloom filter in the following manner. Where there are three hash function, to query for the presence of an element in, for example, bloom filter 402, the target element is given to each of the three hash functions to get three array positions of the bloom filter. If any of the bits at these three positions are "0" in the bitmap, the element is definitely not in the set. If it were in the set, then all the bits at these three positions would have been set to 1 when it was inserted into the bloom filter. If all bits at the three positions are "1," then there is a high probability that the element is in the category corresponding to that bloom filter. Each matching category is recorded in a category store (not shown). In this embodiment, a programmable mapping table is used by result analyzer 510 where there is more than one category determined by the above process. Given a web domain, each bloom filter performs the above operation internally and the query output is provided to the result analyzer, which in-turn maps the bit-vector to the appropriate category according to the mapping table. The result analyzer maps the bit-vector output of the bloom filters and maps it to the user defined category and/or category aggregates.

A simple example of a programmable mapping table is provided in Table 1, below. The first bit vector entry indicates that only the first bloom filter element was matched. This element corresponds to the business category of web domains. The third bit vector entry indicates that only the ninth bloom filter element was matched. This element corresponds to the finance category of web domains. If there are multiple matches, such as the one shown as the fourth bit vector entry, some embodiments of the present invention provide for the user to have the option of mapping the identified set of elements to a particular super category, such as, in the case of 4th entry, where the business category is noted. Alternatively, the output includes the set of matched categories, finance and business.

TABLE 1

Sample Mapping Table

| BIT VECTOR  | CATEGORY |
|-------------|----------|
| 10000000000 | BUSINESS |
| 00010000000 | NEWS     |
| 00000000100 | FINANCE  |
| 10000000100 | BUSINESS |

Some embodiments of the present invention may include one, or more, of the following features, characteristics and/or advantages: (i) provides a O(1) lookup per domain; (ii) uses significantly less space to store the data than conventional inline URL lookup processes; (iii) a low-overhead, inline approach for determining the category of a website identified from an HTTP GET request packet; (iv) does not use a classifier model, but uses the existing hierarchical category databases in a flat structure to do a multi-dimensional equivalent lookup; (v) provides for a mapping table to sort out any overlaps that result from the filtering process; (vi) addresses the challenge related to the hierarchical nature (category, sub categories, etc.) of conventional URL category lookups; (vii) addresses the challenge related to the time and space complexity of conventional URL category lookups; (viii) by using a hash-based strategy to flatten the hierarchy and a mapping table to resolve overlaps, the solution is easy to implement (even in hardware) and has low lookup complexity (hence fast lookups for inline processing); (ix) significant reduction in storage space (for storing URLS) is also obtained through the use of bit vector programming; (x) uses strides of hashes, or hash strides, that form the bloom filter and, therefore, does not require compression of a URL blacklist and/or preprocessing phase, such as with the Wu-Manber algorithm; (xi) does not require a learning phase; (xii) avoids sending the analysis request to network servers (for classification lookup) by performing this operation inline at the gateway nodes; (xiii) works on the URL link extracted from the HTTP GET request (the packet sent to the server and not on its reply); and/or (xiv) uses a probabilistic data structure to store the web domains.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer program product for classifying a uniform resource locator (URL), the computer program product comprising a non-transitory computer readable storage medium having stored thereon:

First program instructions programmed to configure a bloom filter to identify a pre-determined set of URL categories;

Second program instructions programmed to program the bloom filter with a set of URLs, each URL in the set of URLs belonging to a respectively corresponding URL category of the pre-determined URL categories;

Third program instructions programmed to extract a second URL in-line with a data transmission from a network packet stream;

Fourth program instructions programmed to determine a set of hash strides for the second URL;

Fifth program instructions programmed to query the bloom filter with each hash stride of the set of hash strides, the querying being performed in a data plane;

Sixth program instructions programmed to identify a sub-set of categories from the pre-determined set of URL categories, the sub-set of categories being URL categories that correspond to the second URL;

Seventh program instructions programmed to determine a first URL category based, at least in part, on a programmable mapping table that defines the sub-set of URL categories as the first URL category; and Eighth program instructions programmed to report the first URL category as a classification of the second URL in human-readable form.

* * * * *